US009698989B2

(12) United States Patent
Scarlata et al.

(10) Patent No.: US 9,698,989 B2
(45) Date of Patent: Jul. 4, 2017

(54) FEATURE LICENSING IN A SECURE PROCESSING ENVIRONMENT

(71) Applicant: Intel Corporation, Santa Clara, CA (US)

(72) Inventors: Vincent Scarlata, Beaverton, OR (US); Carlos Rozas, Portland, OR (US); Simon Johnson, Beaverton, OR (US); Uday Savagaonkar, Portland, OR (US); Ittai Anati, Haifa (IL); Francis McKeen, Portland, OR (US); Michael Goldsmith, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 360 days.

(21) Appl. No.: 13/949,213

(22) Filed: Jul. 23, 2013

(65) Prior Publication Data

US 2015/0033316 A1    Jan. 29, 2015

(51) Int. Cl.
*H04L 9/32*    (2006.01)
*G06F 21/12*    (2013.01)
*G06F 21/53*    (2013.01)

(52) U.S. Cl.
CPC ............ *H04L 9/3213* (2013.01); *G06F 21/12* (2013.01); *G06F 21/53* (2013.01); *H04L 9/3263* (2013.01)

(58) Field of Classification Search
CPC ..................................................... G06F 21/00
See application file for complete search history.

(56) References Cited

U.S. PATENT DOCUMENTS

| 8,352,740 B2* | 1/2013 | England ............... H04L 9/0897 713/170 |
| 8,438,631 B1 | 5/2013 | Taylor et al. |
| 2005/0283660 A1 | 12/2005 | McKeen et al. |
| 2012/0159184 A1* | 6/2012 | Johnson ............. G06F 12/1466 713/189 |
| 2012/0163589 A1 | 6/2012 | Johnson et al. |
| 2012/0166795 A1 | 6/2012 | Wood et al. |
| 2012/0198538 A1* | 8/2012 | Spring ................... G06F 21/78 726/9 |

(Continued)

FOREIGN PATENT DOCUMENTS

| EP | 2482220 A1 | 8/2012 |
| WO | 2011078855 A1 | 6/2011 |
| WO | 2015/013059 A1 | 1/2015 |

OTHER PUBLICATIONS

International Search Report and Written Opinion received for PCT Patent Application No. PCT/US2014/046610, mailed on Nov. 3, 2014, 11 pages.

(Continued)

*Primary Examiner* — Harunur Rashid
*Assistant Examiner* — Thanh Le
(74) *Attorney, Agent, or Firm* — Nicholson De Vos Webster & Elliott LLP

(57) ABSTRACT

Embodiments of an invention for feature licensing in a secure processing environment are disclosed. In one embodiment, a processor includes an instruction unit and an execution unit. The instruction unit is to receive an instruction to initialize a secure enclave. The execution unit is to execute the instruction. Execution of the instruction includes determining whether a requested feature is licensed for use in the secure enclave.

18 Claims, 5 Drawing Sheets

ARCHITECTURE 400

(56) References Cited

U.S. PATENT DOCUMENTS

2013/0159726 A1   6/2013   Mckeen et al.

OTHER PUBLICATIONS

International Preliminary Report on Patentability received for PCT Patent Application No. PCT/US2014/046610, mailed on Feb. 4, 2016, 8 pages.
Extended European Search Report from European Patent Application No. 14829860.7, mailed Feb. 1, 2017, 6 pages.

* cited by examiner

ARCHITECTURE 400

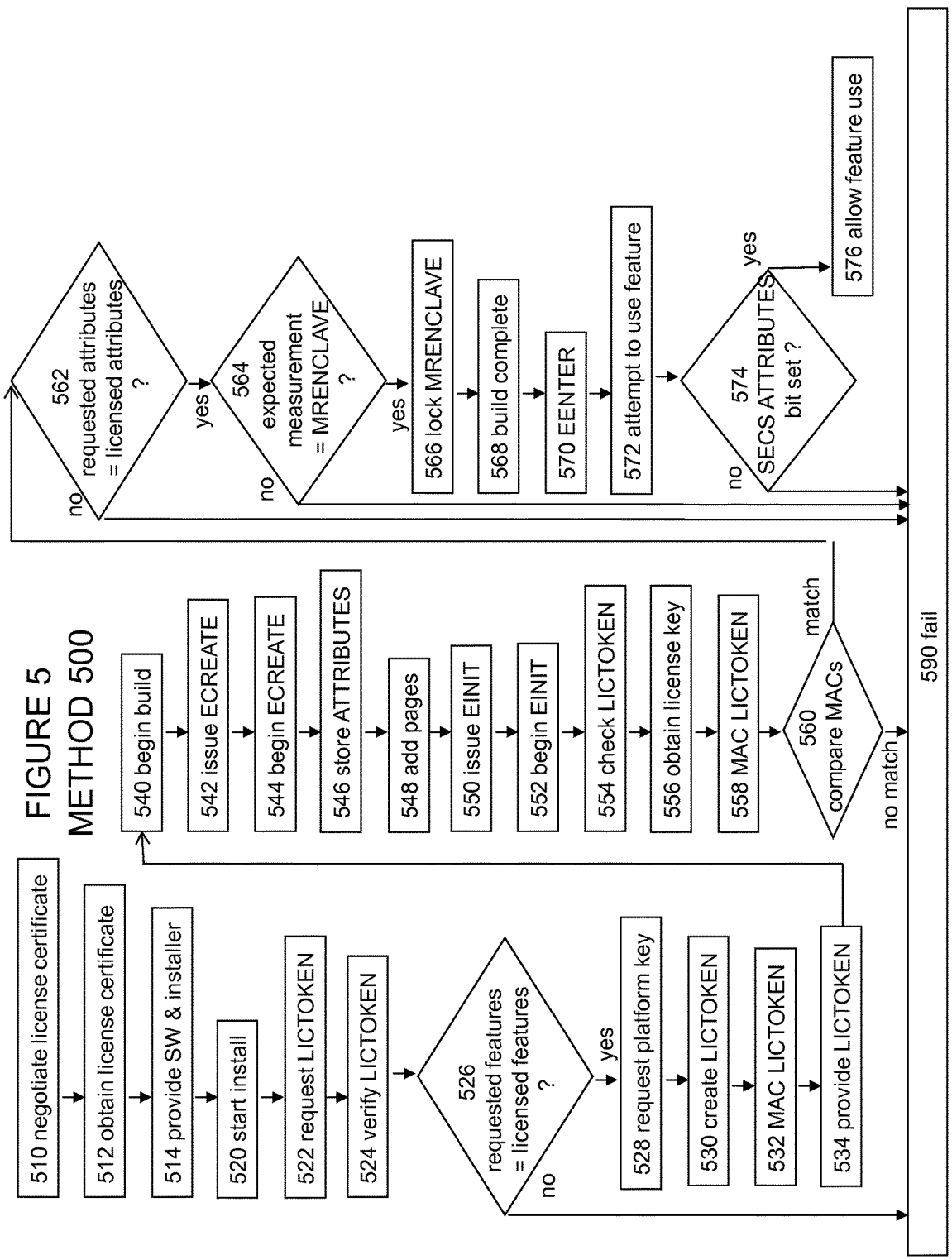

FEATURE LICENSING IN A SECURE PROCESSING ENVIRONMENT

BACKGROUND

1. Field

The present disclosure pertains to the field of information processing, and more particularly, to the field of security in information processing systems.

2. Description of Related Art

Confidential information is stored, transmitted, and used by many information processing systems. Therefore, techniques have been developed to provide for the secure handling and storing of confidential information. These techniques include various approaches to creating and maintaining a secured, protected, or isolated container, partition, or environment within an information processing system.

BRIEF DESCRIPTION OF THE FIGURES

The present invention is illustrated by way of example and not limitation in the accompanying figures.

FIG. 5 illustrates a method for feature licensing in a secure processing environment according to an embodiment of the present invention.

DETAILED DESCRIPTION

Figure 1:
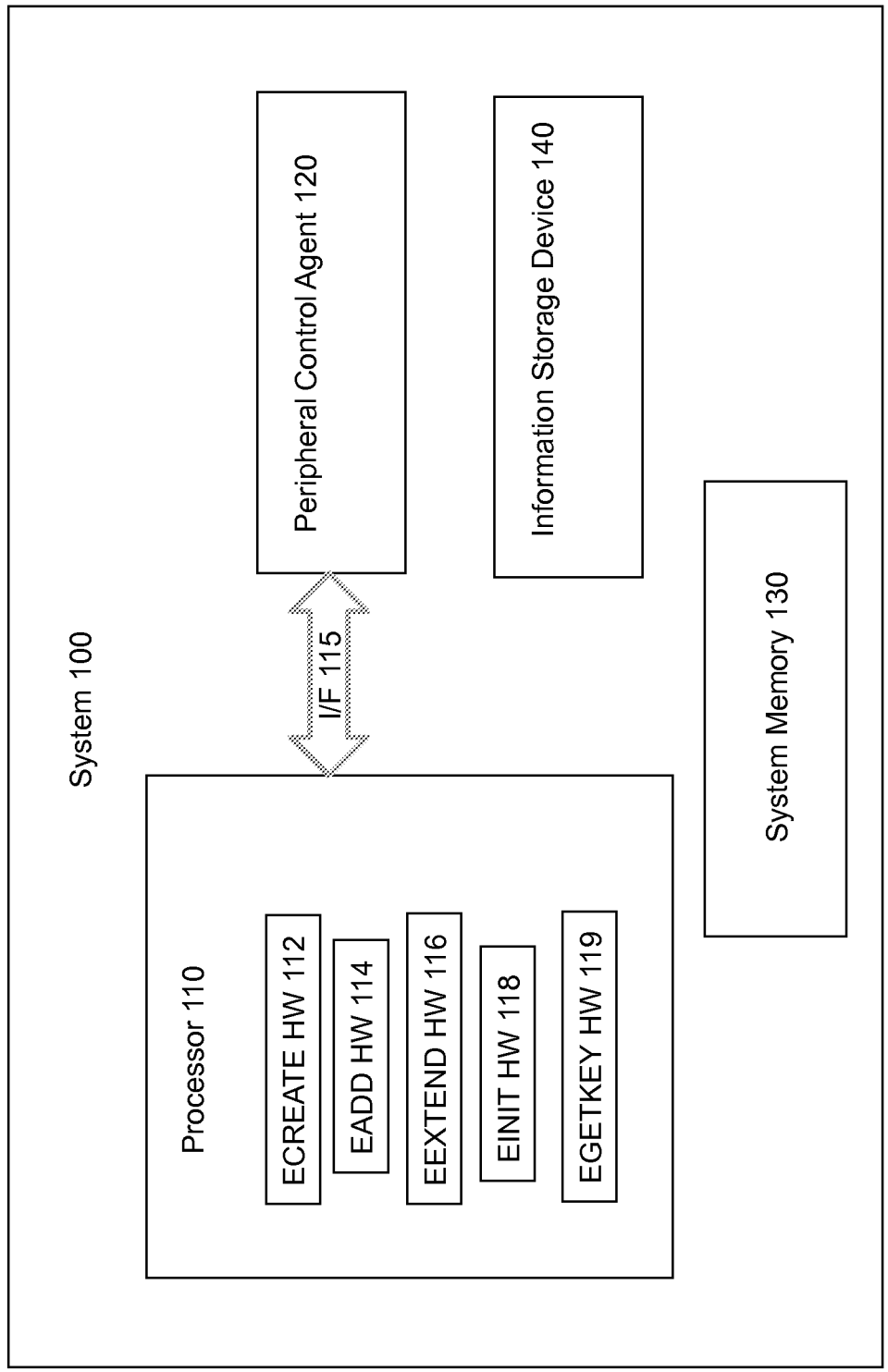
FIG. 1 illustrates a system for featuring licensing in a secure processing environment according to an embodiment of the present invention.

Embodiments of an invention for feature licensing in a secure processing environment are described. In this description, numerous specific details, such as component and system configurations, may be set forth in order to provide a more thorough understanding of the present invention. It will be appreciated, however, by one skilled in the art, that the invention may be practiced without such specific details. Additionally, some well-known structures, circuits, and other features have not been shown in detail, to avoid unnecessarily obscuring the present invention.

In the following description, references to "one embodiment," "an embodiment," "example embodiment," "various embodiments," etc., indicate that the embodiment(s) of the invention so described may include particular features, structures, or characteristics, but more than one embodiment may and not every embodiment necessarily does include the particular features, structures, or characteristics. Further, some embodiments may have some, all, or none of the features described for other embodiments.

As used in the claims, unless otherwise specified the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

Also, the terms "bit," "flag," "field," "entry," "indicator," etc., may be used to describe any type of storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the present invention.

As described in the background section, various approaches to creating and maintaining a secured, protected, or isolated container, partition, or environment within an information processing system have been developed. One such approach involves secure enclaves as described in the co-pending U.S. patent application entitled "Method and Apparatus to Provide Secure application Execution," filed Jun. 19, 2012, Ser. No. 13/527,547, which provides information regarding at least one embodiment of a secured, protected, or isolated container, partition, or environment. However, this reference is not intended to limit the scope of embodiments of the invention in any way and other embodiments may be used while remaining within the spirit and scope of the present invention. Therefore, any instance of any secured, protected, or isolated container, partition, or environment used in any embodiment of the present invention may be referred to herein as a secure enclave or an enclave.

FIG. 1 illustrates system 100, an information processing system in which features may be licensed in a secure processing environment according to an embodiment of the present invention. System 100 may represent any type of information processing system, such as a server, a desktop computer, a portable computer, a set-top box, a hand-held device such as a tablet or a smart phone, or an embedded control system. System 100 includes processor 110, peripheral control agent 120, system memory 130, and information storage device 140. Systems embodying the present invention may include any number of each of these components and any other components or other elements, such as peripherals and input/output devices. Any or all of the components or other elements in this or any system embodiment, may be connected, coupled, or otherwise in communication with each other through any number of buses, point-to-point, or other wired or wireless interfaces or connections, unless specified otherwise. Any components or other portions of system 100, whether shown in FIG. 1 or not shown in FIG. 1, may be integrated or otherwise included on or in a single chip (a system-on-a-chip or SOC), die, substrate, or package.

Peripheral control agent 120 may represent any component including or through which peripheral, input/output, or other components or devices may be connected or coupled to processor 110, such as a chipset. Peripheral control agent 120 may be connected or coupled to processor 110 by interface 115, which may represent any type of bus, point-to-point, or other wired or wireless interface or connection, including a link in an interconnect fabric such as an Intel® Quick Path Interconnect or an embodiment of a High Performance Interconnect described in the co-pending U.S. patent application entitled Method, Apparatus, System for a High Performance Interconnect architecture, filed Oct. 22, 2012, Ser. No. 61/717,091, or any other type of connection according to any other communication architecture.

System memory 130 may be dynamic random access memory or any other type of medium readable by processor 110. Information storage device 140 may include any type of persistent or non-volatile memory or storage, such as a flash memory and/or a solid state, magnetic, or optical disk drive.

Processor 110 may represent one or more processors integrated on a single substrate or packaged within a single package, each of which may include multiple threads and/or multiple execution cores, in any combination. Each processor represented as or in processor 110 may be any type of processor, including a general purpose microprocessor, such as a processor in the Intel® Core® Processor Family, Intel® Atom® Processor Family, or other processor family from Intel® Corporation, or another processor from another company, or a special purpose processor or microcontroller.

Processor 110 may operate according to an instruction set architecture that includes a first instruction to create a secure enclave, a second instruction to add content to an enclave, a third instruction to measure content of an enclave, a fourth instruction to initialize an enclave, and a fifth instruction to get a key to be used for licensing. Although embodiments of the present invention may be practiced with a processor having any instruction set architecture and are not limited to the architecture of a processor family from Intel® Corporation, the instructions may be part of a set of software protection extensions to an existing architecture, and may be referred to herein as an ECREATE instruction, an EADD instruction, an EEXTEND instruction, an EINIT instruction, and an EGETKEY instruction respectively. Support for these instructions may be implemented in a processor using any combination of circuitry and/or logic embedded in hardware, microcode, firmware, and/or other structures arranged as described below or according to any other approach, and is represented in FIG. 1 as ECREATE hardware 112, EADD hardware 114, EEXTEND hardware 116, EINIT hardware 118, and EGETKEY hardware 119.

Figure 2:
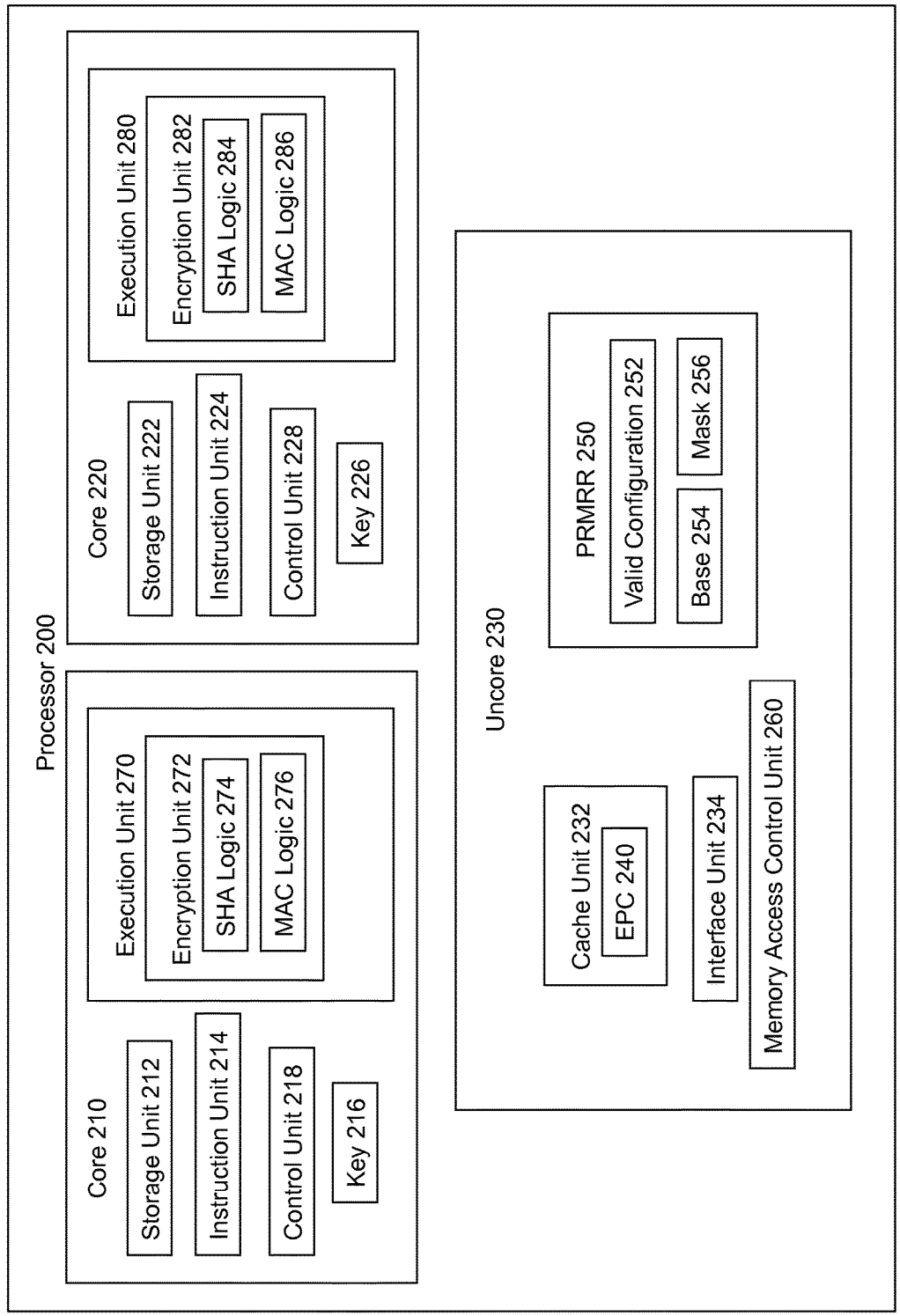
FIG. 2 illustrates a processor for feature licensing in a secure processing environment according to an embodiment of the present invention.

FIG. 2 illustrates processor 200, an embodiment of which may serve as processor 110 in system 100. Processor 200 may include core 210, core 220, and uncore 230. Core 210 may include storage unit 212, instruction unit 214, execution unit 270, control unit 218, and key 216. Core 220 may include storage unit 222, instruction unit 224, execution unit 270, control unit 228, and key 226. Uncore 230 may include cache unit 232, interface unit 234, processor reserved memory range registers 250, and memory access control unit 260. Processor 200 may also include any other circuitry, structures, or logic not shown in FIG. 2. The functionality of the ECREATE hardware 112, the EADD hardware 114, the EEXTEND hardware 116, the EINIT hardware 118, and the EGETKEY hardware 119, as introduced above and further described below, may be distributed among any of the labeled units or elsewhere in processor 200.

Storage units 212 and 222 may include any combination of any type of storage usable for any purpose within cores 210 and 220, respectively; for example, they may include any number of readable, writable, and/or read-writable registers, buffers, and/or caches, implemented using any memory or storage technology, for storing capability information, configuration information, control information, status information, performance information, instructions, data, and any other information usable in the operation of cores 210 and 220, respectively, as well as circuitry usable to access such storage.

Instruction units 214 and 224 may include any circuitry, logic, structures, and/or other hardware for fetching, receiving, decoding, interpreting, and/or scheduling instructions to be executed by cores 210 and 220, respectively. Any instruction format may be used within the scope of the present invention; for example, an instruction may include an opcode and one or more operands, where the opcode may be decoded into one or more micro-instructions or micro-operations for execution by execution unit 216 or 226, respectively. Instructions, such as the ECREATE, EADD, EEXTEND, and EINIT instructions, may be leaves of a single opcode, such as a privileged secure enclave opcode (e.g., ENCLS), where the leaf instructions are specified by the value in a processor register (e.g., EAX). Instructions, such as the EGETKEY instruction, may be also be leaves of a single opcode, such as an unprivileged secure enclave opcode (e.g., ENCLU), where the leaf instructions are also specified by the value in a processor register (e.g., EAX). Operands or other parameters may be associated with an instruction implicitly, directly, indirectly, or according to any other approach.

Execution units 270 and 280 may include any circuitry, logic, structures, and/or other hardware, such as arithmetic units, logic units, floating point units, shifters, etc., for processing data and executing instructions, micro-instructions, and/or micro-operations. Execution units 270 and 280 may include dedicated circuitry, logic, structures, and/or other hardware for measuring data according to embodiments of the present invention or any such measurements may be performed with shared circuitry, logic, structures, and/or other hardware in execution unit 270 and 280 and/or elsewhere in processor 200. Execution units 270 and 280 may include encryption units 272 and 282 respectively.

Encryption units 272 and 282 may represent any circuitry, logic, structures, and/or other hardware to execute any one or more encryption algorithm, the corresponding decryption algorithms, and/or hashing algorithms. Encryption units 272 and 282 may include SHA logic 274 and 284, respectively, to implement a secure hash algorithm such as SHA-256, SHA-512, SHA-3, or SM3, and/or MAC logic 276 and 286, respectively, to generate a method authentication code (MAC), such as an Advanced Encryption Standard Cipher-based MAC (AES-CMAC), and/or any of SHA logic 274, SHA logic 284, MAC logic 276, and MAC logic 286 may represent any dedicated or shared circuitry, logic, structures, and/or other hardware elsewhere in processor 200 to perform these functions. For calculating MACs, MAC logic 276 and 286 may use key 216 and 226, respectively, each of which may represent any key, such as a processor or platform unique key programmed into processor 200 in a fuse array, generated during a boot process, and/or otherwise available as a secret key to be used in a MAC algorithm or for any other purpose.

Control units 218 and 228 may include any microcode, firmware, circuitry, logic, structures, and/or other hardware to control the operation of the units and other elements of cores 210 and 220, respectively, and the transfer of data within, into, and out of cores 210 and 220. Control units 218 and 228 may cause cores 210 and 220 and processor 200 to perform or participate in the performance of method embodiments of the present invention, such as the method embodiments described below, for example, by causing cores 210 and 220 to execute instructions received by instruction units 214 and 224 and micro-instructions or micro-operations derived from instructions received by instruction units 214 and 224.

Cache unit 232 may include any number of cache arrays and cache controllers in one or more levels of cache memory in a memory hierarchy of information processing system 100, implemented in static random access memory or any other memory technology. Cache unit 232 may be shared among any number of cores and/or logical processors within processor 200 according to any approach to caching in information processing systems. Cache unit 232 may also include one or more memory arrays to be used as enclave page cache (EPC) 240 as further described below.

Interface unit 234 may represent any circuitry, logic, structures, and/or other hardware, such as a link unit, a bus unit, or a messaging unit to allow processor 200 to communicate with other components in a system such as system 200 through any type of bus, point to point, or other connection, directly or through any other component, such as a bridge, hub, or chipset. Interface unit 234 may include one or more integrated memory controllers to communicate with a system memory such as system memory 130 or may communicate with a system memory through one or more memory controllers external to processor 200.

Processor reserved memory range registers (PRMRR) 250 may represent any one or more storage locations in storage units 212 and 222, elsewhere in processor 200, and/or copies thereof in uncore 230. PRMRR 250 may be used, for example by configuration firmware such as a basic input/output system, to reserve one or more physically contiguous ranges of memory called processor reserved memory (PRM). Memory access control unit 260 may represent any circuitry, structures, logic, and/or other hardware anywhere in processor 200 that may control access to PRM such that EPC 240 may be created within the system memory space defined as PRM.

In an embodiment, PRM is of a size that is an integer power of two, e.g. 32 MB, 64 MB, or 128 MB, and is aligned to a memory address that is a multiple of that size. PRMRR 250 may include one or more instances of a read-only PRMMR valid configuration register 252 to indicate the valid sizes to which PRM may be configured, one or more instances of a PRMMR base register 254 and a PRMMR mask register 256 to define one or more base addresses and ranges of PRM.

EPC 240 is a secure storage area in which software may be protected from attacks by malware operating at any privilege level. One or more secure enclaves may be created such that each enclave may include one or more pages or other regions of EPC 240 in which to store code, data, or other information in a way that it may only be accessed by software running inside that enclave. For example, a secure enclave may be used by a software application so that only that software application, while running inside that enclave, may access the contents of that enclave. No other software, not even an operating system or a virtual machine monitor, may read the unencrypted contents of that enclave, modify the contents of that enclave, or otherwise tamper with the contents of that enclave while the content is loaded into the EPC (assuming that the enclave is a production enclave, as opposed to, for example, a debug enclave). However, the contents of the enclave may be accessed by software executing from within that enclave on any processor in system 100. This protection is accomplished by the memory access control unit 260 operating according to the secure enclaves architecture.

In FIG. 2, EPC 240 is shown in cache unit 232, where it may be a sequestered portion of a shared cache or a dedicated memory. Within or on the same die as processor 200, EPC 240 may be implemented in static random access memory, embedded dynamic random access memory, or any other memory technology. EPC 240 may also or additionally be implemented external to processor 200, for example within a secure region of system memory 130. To protect the content of secure enclaves when it is not stored on-die, encryption units 272 and/or 282 may be used to encrypt the content before it is transferred off-die and to decrypt the content transferred back into EPC 240 on-die. Other protection mechanisms may also be applied to protect the content from replay and other attacks.

Figure 3:
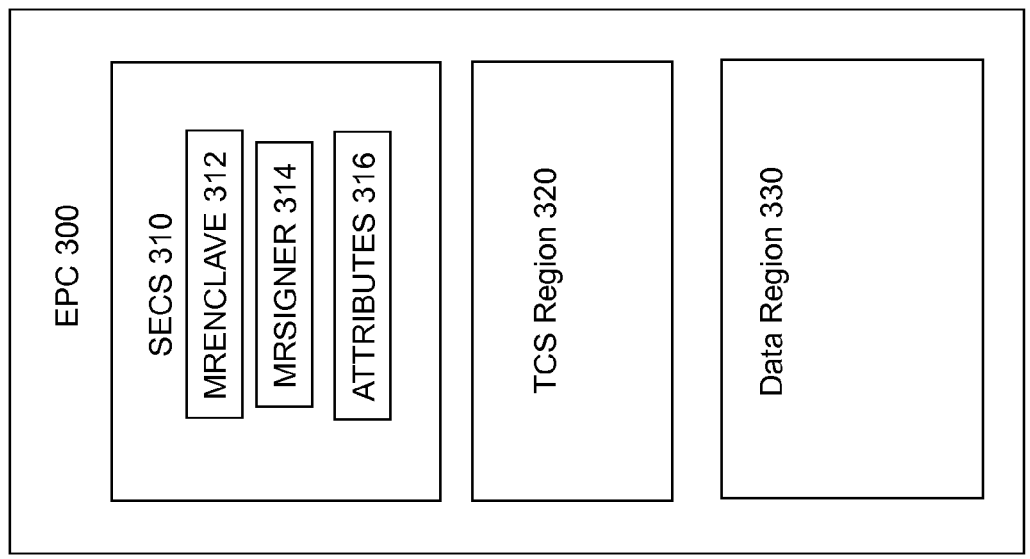
FIG. 3 illustrates an enclave page cache according to an embodiment of the present invention.

FIG. 3 illustrates EPC 300, an embodiment of which may serve as EPC 240 in FIG. 2. In FIG. 3, EPC 300 includes secure enclave control structure (SECS) 310, thread control structure (TCS) region 320, and data region 330. Although FIG. 3 shows EPC 300 divided into three separate regions, EPC 300 may be divided into any number of chunks, regions, or pages, each of which may be used for any type of content. In one embodiment, it is divided into 4 kilobyte (KB) pages and is aligned to an address in system memory 130 that is a multiple of 4 KB, SECS 310 may be any one of the 4 KB pages in EPC 300, TCS region 320 may be any number of contiguous or non-contiguous 4 KB pages, and data region 330 may be any number of contiguous or non-contiguous 4 KB pages. Furthermore, although FIG. 3 shows one SECS, one TCS region, and one data region corresponding to one secure enclave, an EPC may include any number of SECS and any number of TCS and data regions, so long as each enclave has one and only one SECS, each valid TCS and valid data region (e.g., page) belongs to one and only one enclave, and all of the SECS, TCS, and data pages fit within the EPC (or may be paged out of and back into the EPC).

An SECS is created by the execution of the ECREATE instruction to contain metadata to be used by hardware, and accessible only by hardware (i.e., not readable, writable, or otherwise accessible by software, whether running inside or outside the enclave), to define, maintain, and protect the enclave. For example, SECS 310 includes a first measurement register (MRENCLAVE) 312, which may be any size field within SECS 310; in one embodiment, MRENCLAVE 312 may be 32 bytes. MRENCLAVE 312 is to store the build measurement (as described below) of the enclave, which is initialized by the ECREATE instruction, updated by every EADD and EEXTEND instruction associated with the enclave, and locked by the EINIT instruction associated with the enclave. SECS 310 also includes a second measurement register (MRSIGNER) 314 to store a measurement of an identifier, such as a public key, of the entity that verified the creation of the enclave, as further described below. In one embodiment, MRSIGNER 314 may be 32 bytes. Enclave attributes, as described below, may be stored in ATTRIBUTES field 316, which in one embodiment may have a size of 16 bytes.

One or more TCSs may also be associated with a secure enclave. A TCS contains metadata used by the hardware to save and restore thread specific information when entering and exiting the enclave.

The security attributes of each page are stored in a micro-architectural data structure called an enclave page cache map (EPCM) that is used by memory access control unit 260 to enforce the protections provided by the secure enclaves architecture. The EPCM stores one entry for each page in the EPC. Each entry includes an identifier (e.g., a 64 bit field) of the SECS (i.e., the enclave) to which the page belongs. These identifiers may be referred to by secure enclaves instructions (e.g., the address of the SECS may be stored in a register such as RCX, the address of a microarchitectural data structure including the address of the SECS may be stored in a register such as RBX, etc.) such as EADD, EEXTEND, and EINIT, to provide for the SECS to be read by hardware in order to execute the instruction.

Figure 4:
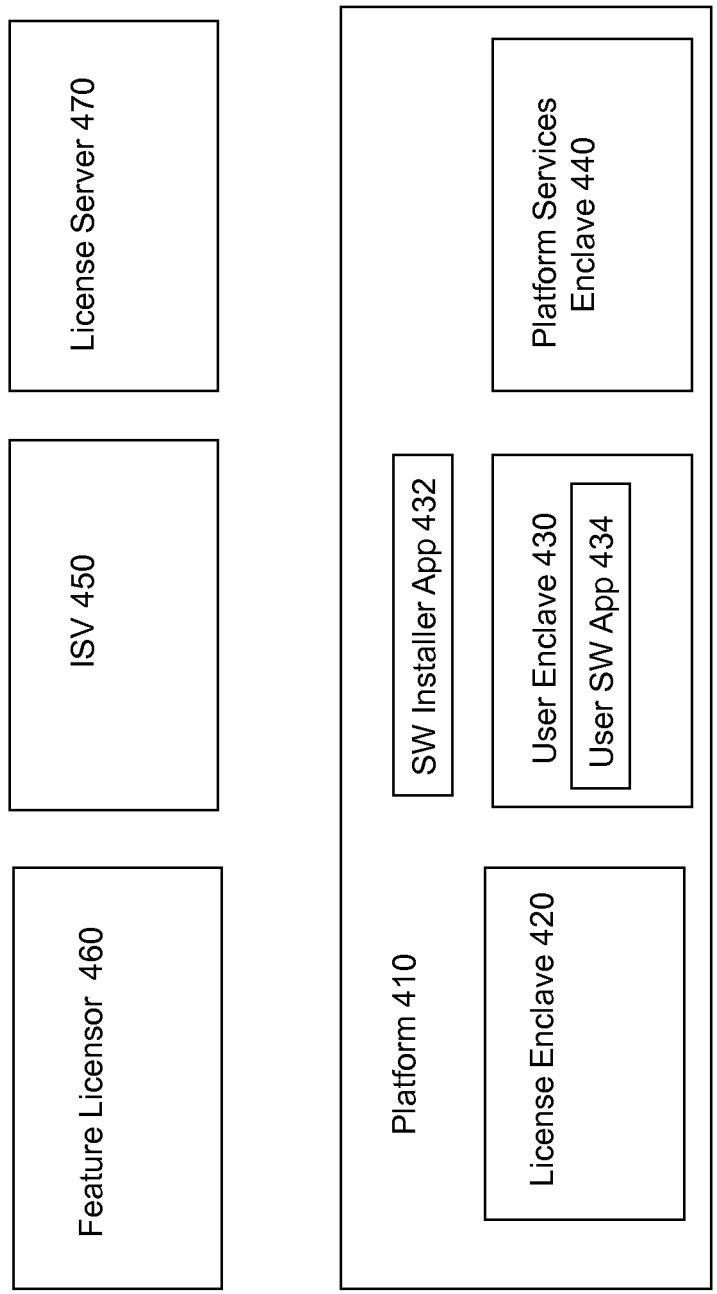
FIG. 4 illustrates an architecture for feature licensing in a secure processing environment according to an embodiment of the present invention

FIG. 4 illustrates architecture 400, an architecture for feature licensing in a secure processing environment according to an embodiment of the present invention. In one embodiment, architecture 400 includes platform 410, independent software vendor (ISV) 450, feature licensor 460, and license server 470.

Platform 410 may be an embodiment of system 100, in which secure enclaves 420, 430, and 440 may be created on a processor such as processor 110. License enclave 420 may be a licensing enclave responsible for verifying licenses and granting license tokens (as described below) according to embodiments of the present invention. User enclave 430 may be a user enclave created by software installer application 432 running outside of user enclave 430. User software application 434 may run inside user enclave 430. Platform services enclave 440 may be a special purpose enclave responsible for requesting the use of features of platform 410 outside of processor 110, for example, special storage, counters, trusted input/output, and/or other features provided by or available through peripheral control agent 120.

ISV 450 may represent any software developer, content provider, service provider, or any other entity that may provide software, content, or services to be run, consumed, or provided on platform 410. Feature licensor 460 may be a processor vendor, a system vendor, or any other entity that may provide license certificates for security or other features of platform 410 to be used by software, content consumption, or services on platform 410. For example, feature licensor 460 may represent Intel® Corporation where processor 110 is in a processor family from Intel® Corporation. License server 470 may be any system to approve the issuance of a license according to an embodiment of the present invention.

Embodiments of the present invention may provide for platform features to be licensed by software, content, and/or service providers, such that the cost of providing such features may be borne by such providers instead of the purchaser of the platform, and the platform provider may derive income from such providers for the use of the features. Such features may include the ability to protect a software application's code and data from being read, modified, or otherwise tampered with by unauthorized users, even unauthorized users with the highest available privilege level. The use of such features may be desired by providers to protect premium media content, online banking information, enterprise document production, etc.

FIG. 5 illustrates method 500, a method for licensing features in a secure processing environment according to an embodiment of the present invention. Although method embodiments of the invention are not limited in this respect, reference may be made to elements of FIGS. 1, 2, 3, and 4 to help describe the method embodiment of FIG. 5. Method 500 includes the building of a secure enclave using ECREATE, EADD, EEXTEND, and EINIT instructions, and a request for a key using an EGETKEY instruction; however, embodiments of the present invention are not limited to these specifically named instructions.

In box 510, ISV 450 negotiates with feature licensor 460 for a license certificate to one or more security or other features of platforms including platform 410. Having a license certificate for particular platform features gives ISV 450 the right to license platforms to use those features.

According to embodiments of the present invention, particular features of a platform may be enabled for use by an application for which the ISV has obtained a license certificate and disabled otherwise. Each particular feature for which use may be enabled or disabled according to embodiments of the present invention is referred to herein as a licensable feature.

In box 512, ISV 450 obtains a license certificate from feature licensor 460 for one or more of the licensable features. Each feature for which a license certificate has been obtained is referred to herein as a licensed feature. The license certificate may be a digitally signed digital certificate representing a license agreement between ISV 450 and feature licensor 460, including an indication of which features are licensed.

In box 514, ISV 450 provides software installer application 432 and user software application 434 to platform 410. Software installer application 432 includes a measurement (as described below) of user software application 434 as it is expected to be built in user enclave 430 (the expected measurement of user enclave 430), a measurement of an identifier (such as a public key) of ISV 450, a list of platform features to be used by user software application 434 or the enclave in which it runs (e.g., in an ATTRIBUTES bit array), and a license certificate indicating that that software application 434 is licensed to use the licensed features. The license certificate may also include the two measurements and/or any other information.

In box 520, software installer application 432 begins to prepare to install user software application 434 on platform 400. In box 522, software installer application 432 requests (e.g., by issuing a license token request call or instruction) a license token from license enclave 420 (which, as used herein, includes a licensing software application running in license enclave 420). The license token may be a microarchitectural data structure (e.g., LICTOKEN) having a unique value for an enclave to be built (e.g., user enclave 430). Requesting the license token in box 522 may include providing (e.g., from the information provided in box 514), the expected measurement of user enclave 430, the list of platform features requested for user enclave 430, and the license certificate.

In box 524, license enclave 420 verifies that the license certificate is authentic, for example by verifying its digital signature. In box 526, license enclave 420 compares the list of platform features that software installer application 432 is requesting to the list of licensed features in the license certificate. If every requested platform feature is a licensed feature, then method 500 continues in box 528. If not, then method 500 continues in box 590.

In box 528, license enclave 420 requests (e.g., by issuing an EGETKEY instruction) a key (e.g., a processor or platform unique key such as key 276) to use in creating the license token. In box 530, license enclave 420 creates the license token, which includes the expected measurement of user enclave 430 and an ATTRIBUTES bit array, where each bit in the LICTOKEN ATTRIBUTES bit array corresponds to a specific platform feature. If a bit in LICTOKEN ATTRIBUTES bit array is set, it means that the enclave is licensed to use the corresponding feature. In box 532, a MAC (e.g., an AES-CMAC) is calculated, for example, using a license key derived from key 276, where the MAC is based on the contents of the license token and is included in the license token.

In box 534, the license token is provided (e.g., returned from the license token request call or instruction in box 522) to software installer application 432.

In box 540, a build of user enclave 430 on platform 410 begins, in order to provide a protected environment in which to run user software application 434. In box 542, an ECREATE instruction is issued by software installer application 432 to create user enclave 430. In box 544, execution of the ECREATE instruction, for example by execution unit 270 or 280, begins. In one embodiment, execution of the ECREATE instruction includes the allocation of a range of addresses for use by user enclave 430. In one embodiment, the addresses may be a first type of address, for example a virtual or linear addresses, to be translated to a second type of address, for example a physical address in a system memory such as system memory 130.

Execution of the ECREATE instruction may also include, in box 546, establishing attributes of the enclave and storing the enclave attributes in an SECS, for example, in ATTRIBUTES field 316 of SECS 310. A micro-architectural data structure (e.g., PAGEINFO), may be associated with the ECREATE instruction (e.g., its address in the RBX register). PAGEINFO may have a field specifying the address of a source SECS to be copied to SECS 310. The source SECS may include a source SECS ATTRIBUTES bit array (e.g., as provided by ISV 450 in box 516) to be copied to SECS ATTRIBUTES field 316. Each bit in the source SECS ATTRIBUTES bit array and the corresponding bit in SECS ATTRIBUTES field 316 may correspond to a specific platform feature. If the bit is set in the source SECS ATTRIBUTES bit array, the creator of the enclave (e.g., software installer application 432) intends for the corresponding feature to be enabled in the enclave being created (e.g., user enclave 430), in other words, intends for the corresponding feature to be available to, usable by, or used for the software application or applications to be run in the enclave (e.g., user software application 434). However, the feature is not enabled unless a license to use the feature is verified as described below or according to another embodiment of the present invention.

In box 548, software installer application 432 may add one or more pages (or other regions) to the enclave, for example by issuing one or more EADD instructions, and have them measured, for example by issuing one or more EEXTEND instructions. Adding a page to the enclave may include copying a source page from system memory into the EPC and associating the EPC page with the enclave's SECS. The source page may be a regular page containing unencrypted code, data, or other information for the data region of the enclave, or the source page may be a TCS page containing data for the TCS region. Having them measured may include incrementally calculating or extending a cryptographic hash based on the content, location, and/or other attributes of the page or pages, and storing the hash in MRENCLAVE 312. In this embodiment, the added pages may include code, data, stack, heap, etc. for user software application 434.

In box 550, software installer application issues an EINIT instruction in order to finalize the build of user enclave 430 and initialize it. In one embodiment, EINIT is the leaf of ENCLS with the value 0x2 in the EAX register. In box 552, execution of the EINIT instruction, for example by execution unit 270 or 280, begins.

In one embodiment, execution of the EEINIT instruction may include, in box 554, checking a license token to ensure that the corresponding enclave is valid. The license token used in box 554 may be associated with the EINIT instruction (e.g., its address in the RDX register). In this embodiment, the license token may be the license token provided by license enclave 420 to software installer application 432 in box 534.

Checking the license token may include, in box 556, obtaining the license key that was used in creating the license token (or the key used to derive the license key), and, in box 558, using the license key to calculate a MAC based on the contents of the license token. In box 560, the MAC calculated in box 558 is compared to the MAC included in the license token. If they match, then method 500 continues in box 562. If not, method 500 continues in box 590.

The license token may include an ATTRIBUTES bit array, where each bit in the LICTOKEN ATTRIBUTES bit array corresponds to a bit in SECS ATTRIBUTES field 316 and a specific platform feature, where the SECS may also be associated with the EINIT instruction (e.g., its address in ECX). If a bit in LICTOKEN ATTRIBUTES bit array is set, it means that the enclave is licensed to use the corresponding feature.

Checking the license token also includes, in box 562, comparing each bit in the LICTOKEN ATTRIBUTES bit array with the corresponding bit in SECS ATTRIBUTES field 316, which holds a copy of the source SECS ATTRIBUTES bit array used to create the enclave. If every bit set in SEC ATTRIBUTES field has a corresponding bit set in the LICTOKEN ATTRIBUTES bit array, then method 500 continues in box 564. If not, then method 500 continues in box 590.

Checking the license token may also include, in box 564, comparing the final value in MRENCLAVE 312 with the expected measurement of the enclave from the license token, where in one embodiment the final value of MRENCLAVE 312 is a unique SHA-256 digest that identifies, cryptographically, the code and data placed inside the enclave, the position and placement order of the pages inside the enclave, and the security properties of each page. If the value in MRENCLAVE 312 matches the expected measurement, then method 500 continues in box 566. If not, then method 500 continues in box 590.

In box 566, execution of the EINIT instruction continues with the locking of MRENCLAVE 312 such that its contents remain unchanged, even by the subsequent execution of an EADD or an EEXTEND instruction, and the setting of an attribute indicator in the SECS to prevent any more regions or pages from being added to the enclave. In box 568, the build of user enclave 430 is complete.

In box 570, user enclave 430 may be entered (e.g., by issuing an EENTER instruction) in order to securely execute user software application 434. In box 572, user software application 434 may issue an instruction that requires the use of a licensable feature, for example, a request for a key to be used to encrypt, decrypt, seal, or unseal information (or for any other purpose). In box 574, the corresponding bit in the SECS ATTRIBUTES field (e.g., ATTRIBUTES field 316) is checked. If the bit is set, the feature use is allowed and the instruction may execute (e.g., the key may be returned to user software application 434) in box 576. If not, method 500 continues in box 590.

In box 590, an error condition is raised. For example, a call or instruction may return an error code indicating that an enclave initialization or a request to use a licensable feature failed.

In various embodiments of the present invention, the method illustrated in FIG. 5 may be performed in a different order, with illustrated boxes combined or omitted, with additional boxes added, or with a combination of reordered, combined, omitted, or additional boxes.

One example of a possible difference between method 500 and an alternative embodiment may include license enclave 420 contacting an external server for approval. In one such embodiment, a license certificate may provide for a limited number of platform licenses to be granted (the license limit). In this embodiment, box 524 may also include license enclave 420 connecting with license server 470 to request a new platform license, license server 470 keeping a count of licensed platforms (i.e., activations of the feature on platforms), license server approving the granting of a new platform license if the number of licensed platforms is less than license limit, and rejecting the request for a new platform license if the number of licensed platforms is equal to or greater than the license limit.

As another example, a licensable feature may not be able to be controlled (e.g., enabled or disabled) by processor 110. For example, the licensable feature (e.g., special storage, counters, or trusted input/output) may be controlled by peripheral control agent 120. In this embodiment, platform services enclave 440 may establish a trusted channel between processor 110 and peripheral control agent 120 (e.g., through interface 125) and request the special feature. Before establishing the channel and making the request, platform services enclave 440 may check a special token from license enclave 120, to verify its authenticity and that a license has been approved for the requesting software application to use the special feature on platform 100. The special token may be created by license enclave 420, for example by using an enclave reporting facility (e.g., an EREPORT instruction) that generates a protected data structure (a report) stamped with the identity of the source. The special token may be a report including information regarding user enclave 430 and its SECS ATTRIBUTES, stamped with the identity of license enclave 420. In this embodiment, the SECS ATTRIBUTES field may include platform features in addition to processor-specific features.

Furthermore, method embodiments of the present invention are not limited to method 500 or variations thereof. Many other method embodiments (as well as apparatus, system, and other embodiments) not described herein are possible within the scope of the present invention.

Embodiments or portions of embodiments of the present invention, as described above, may be stored on any form of a machine-readable medium. For example, all or part of method 500 may be embodied in software or firmware instructions that are stored on a medium readable by processor 110, which when executed by processor 110, cause processor 110 to execute an embodiment of the present invention. Also, aspects of the present invention may be embodied in data stored on a machine-readable medium, where the data represents a design or other information usable to fabricate all or part of processor 110.

Thus, embodiments of an invention for feature licensing in a secure processing environment have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A processor comprising:
an instruction decoder to decode a first instruction and a second instruction, wherein the first instruction is to be issued by a software installer application to finalize a build of a secure enclave in which to run a user software application, the first instruction is also to initialize the secure enclave, the second instruction is from the user software application running within the secure enclave after the secure enclave has been initialized by execution of the first instruction, and the second instruction is to use a requested platform feature provided by a component outside of the processor;
execution circuitry to execute the first instruction, wherein execution of the first instruction includes determining whether the requested platform feature is licensed for use in the secure enclave, the execution circuitry to execute the second instruction only if execution of the first instruction determines that the requested platform feature is licensed for use in the secure enclave.

2. The processor of claim 1, wherein initialization fails if the requested platform feature is not licensed for use in the secure enclave.

3. The processor of claim 1, wherein execution of the first instruction also includes verifying a license token associated with the first instruction, wherein the license token includes a list of licensed platform features.

4. The processor of claim 3, wherein the processor also comprises a key to be used to verify the license token.

5. The processor of claim 1, wherein the instruction decoder is also to decode a third instruction, wherein the third instruction is to create the secure enclave, and the execution circuitry is also to execute the third instruction, wherein execution of the third instruction includes setting an indicator for the requested platform feature in a control structure associated with the secure enclave.

6. The processor of claim 5, wherein determining, during execution of the first instruction, whether the requested platform feature is licensed for use in the secure enclave includes comparing the indicator to a corresponding bit in the list of licensed platform features in the license token.

7. The processor of claim 5, wherein execution of the second instruction includes determining whether the requested platform feature is licensed for use in the secure enclave by checking the indicator in the control structure.

8. A method comprising:
issuing, by a software installer application, a first instruction to a processor to finalize a build of a secure enclave in which to run a user software application and to initialize the secure enclave;
executing the first instruction, wherein execution of the first instruction includes determining whether a requested platform feature provided by a component outside the processor is licensed for use in the secure enclave;
issuing a second instruction, by the user software application running within the secure enclave after the secure enclave has been initialized by execution of the first instruction, wherein the second instruction is to use the requested platform feature; and
executing the second instruction only if the requested platform feature is licensed for use in the secure enclave.

9. The method of claim 8, wherein initialization fails if the requested platform feature is not licensed for use in the secure enclave.

10. The method of claim 8, wherein execution of the first instruction also includes verifying a license token associated with the first instruction, wherein the license token includes a list of licensed platform features.

11. The method of claim 10, further comprising using a processor-unique key to verify the license token.

12. The method of claim 8, further comprising issuing a third instruction, wherein the third instruction is to create the secure enclave, and executing the third instruction, wherein execution of the third instruction includes setting an indicator for the requested platform feature in a control structure associated with the secure enclave.

13. The method of claim 12, wherein determining, during execution of the first instruction, whether the requested platform feature is licensed for use in the secure enclave includes comparing the indicator to a corresponding bit in the list of licensed platform features in the license token.

14. The method of claim 12, wherein execution of the second instruction includes determining whether the requested platform feature is licensed for use in the secure enclave by checking the indicator in the control structure.

15. The method of claim 8, further comprising creating, by a license enclave, the license token, wherein creating the license token includes checking whether the requested platform feature is included as a licensed platform feature in a license certificate.

16. The method of claim 8, wherein determining whether a requested platform feature is licensed for use in the secure enclave includes contacting a license server for approval.

17. A system comprising:
 a peripheral control agent to provide a platform feature; and
 a processor including
  an instruction decoder to decode a first instruction and a second instruction, wherein the first instruction is to be issued by a software installer application to finalize a build of a user enclave in which to run a user software application, the first instruction is also to initialize the user enclave, the second instruction is from the user software application running within the user enclave after the user enclave has been initialized by execution of the first instruction, and the second instruction is to use a requested platform feature provided by a component outside of the processor; and
  execution circuitry to execute the first instruction, wherein execution of the first instruction includes determining whether the platform feature is licensed for use in the user enclave, the execution circuitry to execute the second instruction only if execution of the first instruction determines that the platform feature is licensed for use in the user enclave.

18. The system of claim 17, wherein a platform services enclave is to determine whether the platform feature is licensed for use in the user enclave by examining a license token created by a license enclave.

* * * * *